United States Patent
Gould

(10) Patent No.: US 7,493,467 B2
(45) Date of Patent: Feb. 17, 2009

(54) ADDRESS SCRAMBLING TO SIMPLIFY MEMORY CONTROLLER'S ADDRESS OUTPUT MULTIPLEXER

(75) Inventor: Geoffrey A Gould, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 344 days.

(21) Appl. No.: 11/305,782

(22) Filed: Dec. 16, 2005

(65) Prior Publication Data

US 2007/0143568 A1    Jun. 21, 2007

(51) Int. Cl.
*G06F 12/00* (2006.01)
(52) U.S. Cl. .................. 711/211; 365/230.02; 711/1
(58) Field of Classification Search .................. 711/211
See application file for complete search history.

(56) References Cited

U.S. PATENT DOCUMENTS

| | | | | |
|---|---|---|---|---|
| 5,901,105 | A * | 5/1999 | Ong et al. ............... | 365/230.06 |
| 6,199,153 | B1 * | 3/2001 | Razdan et al. ............ | 711/212 |
| 6,260,101 | B1 * | 7/2001 | Hansen et al. ............ | 711/5 |
| 6,850,457 | B2 * | 2/2005 | Cowles et al. ............ | 365/230.08 |
| 7,133,996 | B2 * | 11/2006 | Ikeda et al. .............. | 711/206 |

OTHER PUBLICATIONS

Intel PXA27x Processor Family Developer's Manual, Section 6.4.2.3, "SDRAM Memory Size Options," pp. 6-8 to 6-19.
Intel 82845 MCH for DDR Datasheet, Section 5.2.3, "Memory Address Translation and Decoding," p. 111.

* cited by examiner

*Primary Examiner*—Kevin L Ellis
*Assistant Examiner*—Matthew Bradley
(74) *Attorney, Agent, or Firm*—Blakely, Sokoloff, Taylor & Zafman LLP

(57) ABSTRACT

A memory controller receives a logical address of a data unit in a memory and scrambles the logical address according to an address scrambling scheme. The address scrambling scheme maps the logical address to time-multiplexed output of physical address pins of the memory controller. At least one of the physical address pins, which is to be mapped in a time phase in a baseline design, is to be unmapped in a corresponding time phase if a dimensional parameter of the memory changes. The logical address comprises row address bits and column address bits. All of the even row address bits may be mapped in a time phase for outputting the row address, and all of the odd row address bits may be mapped in another time phase for outputting the row address. Thus, configuration flexibility of the memory controller is improved.

18 Claims, 5 Drawing Sheets

Address Scramble for 128-bit Row Size (baseline)

| TOTAL MEMORY SIZE | BA1 | BA0 | A12 | A11 | A10 | A9 | A8 | A7 | A6 | A5 | A4 | A3 | A2 | A1 | A0 | COMMAND(ADDRESS) | TIME PHASE |
|---|---|---|---|---|---|---|---|---|---|---|---|---|---|---|---|---|---|
| 256 Mbit | a5 | a4 |  |  |  | a24 | a22 | a20 | a18 | a16 | a14 | a12 | a10 | a8 | a6 | ACTIVE (EVEN ROW ADDR) | I |
|  | a5 | a4 |  |  |  |  | a23 | a21 | a19 | a17 | a15 | a13 | a11 | a9 | a7 | ACTIVE (ODD ROW ADDR) | II |
|  | a5 | a4 |  |  |  |  |  |  |  |  |  |  | a3 | a2 | a1 | READ OR WRITE (COL. ADDR.) | III |

$a_1 - a_{24}$ : Logical Address Bits $A_0 - A_{12}$ : Physical Address Pins $BA_0 - BA_1$ : Bank Address Pins

FIG. 4

Address Scramble for 1024-bit Row Size

| TOTAL MEMORY SIZE | BA1 | BA0 | A12 | A11 | A10 | A9 | A8 | A7 | A6 | A5 | A4 | A3 | A2 | A1 | A0 | COMMAND(ADDRESS) | TIME PHASE |
|---|---|---|---|---|---|---|---|---|---|---|---|---|---|---|---|---|---|
| 256 Mbit | a7 | a8 | | | | a24 | a22 | a20 | a18 | a16 | a14 | a12 | a10 | X | X | ACTIVE (EVEN ROW ADDR) | I |
| | a7 | a8 | | | | | a23 | a21 | a19 | a17 | a15 | a13 | a11 | a9 | X | ACTIVE (ODD ROW ADDR) | II |
| | a7 | a8 | | | | | | | a6 | a5 | a4 | a3 | a2 | a1 | READ OR WRITE (COL. ADDR.) | III |

$a_1 - a_{24}$ : Logical Address Bits $A_0 - A_{12}$ : Physical Address Pins $BA_0 - BA_1$ : Bank Address Pins

FIG. 5

ADDRESS SCRAMBLING TO SIMPLIFY MEMORY CONTROLLER'S ADDRESS OUTPUT MULTIPLEXER

BACKGROUND

1. Field of the Invention

Embodiments relate to the design of a memory controller.

2. Background

A memory controller is an interface between an external memory and a processing core, e.g., a central processing unit (CPU). A memory controller receives a memory access request from the CPU, which specifies the logical address of a data unit in the external memory. A "data unit" refers to smallest addressable unit of data in the memory, e.g., a byte, a word, or a double-word. The memory controller scrambles, or maps, the logical address bits into its physical address pins connecting to the memory.

As the memory controller typically has fewer physical address pins than the number of logical address bits, output from the physical address pins is time-multiplexed. In a typical synchronous dynamic random access memory (SDRAM) bus protocol, during a first time phase (which may take one or more clock periods) the memory controller delivers a row address. During a later time phase the memory controller delivers a column address. Typically, column address bits are the least-significant logical address bits received from the CPU. Bank address bits and row address bits are the more-significant logical address bits.

Different memories may have different sizes, e.g., row size, data width, or memory density. The term "data width" refers to the size of a data unit. The term "row size" refers to the number of bits in a row, which is equal to the data width multiplied by the number of columns. The term "memory density" refers to the total number of bits in the memory and is synonymous to "total memory size." When the row size changes but data width remains the same, the number of columns changes. Thus, the number of column address bits changes and the positions of the row address bits are shifted to different positions in the logical address. As a result, when a memory controller is connected to a memory with a different row size, row address bits are routed onto different physical address pins. Similar changes occur when the data width of the memory varies.

Existing double data rate (DDR) SDRAM memory controllers handle limited row sizes for limited memory densities. The existing memory controllers are allowed to scramble many logical address bits arbitrarily as needed to simplify their design. However, the existing memory controllers cannot easily handle a wide range of memory sizes without greatly increasing their complexity.

Moreover, flash memory introduces new row sizes and may cause more scrambling scenarios to be built into the design of the memory controller. The variety of the scrambling scenarios would threaten to inflate the complexity of the memory controller's address output multiplexer. Due to the blocking and partitioning of memory cells in the flash memory, flash memory restricts address scrambling so that the memory controllers are prohibited from scrambling many logical address bits arbitrarily as was done in the past. The restriction thus eliminates one of the existing methods of simplifying the memory controller design.

To accommodate the different memory sizes, the address output multiplexer of the memory controller needs to be designed with configurable flexibility to increase the variability of memories with which the memory controller is compatible. The variability herein refers to dimensional parameters of the memory. The term "dimensional parameter" refers to the dimensions defining a memory including, but not limited to, row size, data width, and memory density. An increase in a memory dimension, e.g., row size, is usually associated with increased performance and increased cost. Part of the increase in cost comes from the increased complexity of the memory controller design. Thus, it is an objective of the circuit designer to accommodate a diverse range of memory dimensions without adding complexity to the address output multiplexers in the memory controller.

BRIEF DESCRIPTION OF THE DRAWINGS

Embodiments are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIG. 4 is a mapping table showing a baseline address scrambling scheme for an external memory with a 128-bit row size.

FIG. 5 is another mapping table showing the address scrambling scheme applied to an external memory with a 1024-bit row size.

DETAILED DESCRIPTION

Figure 1:
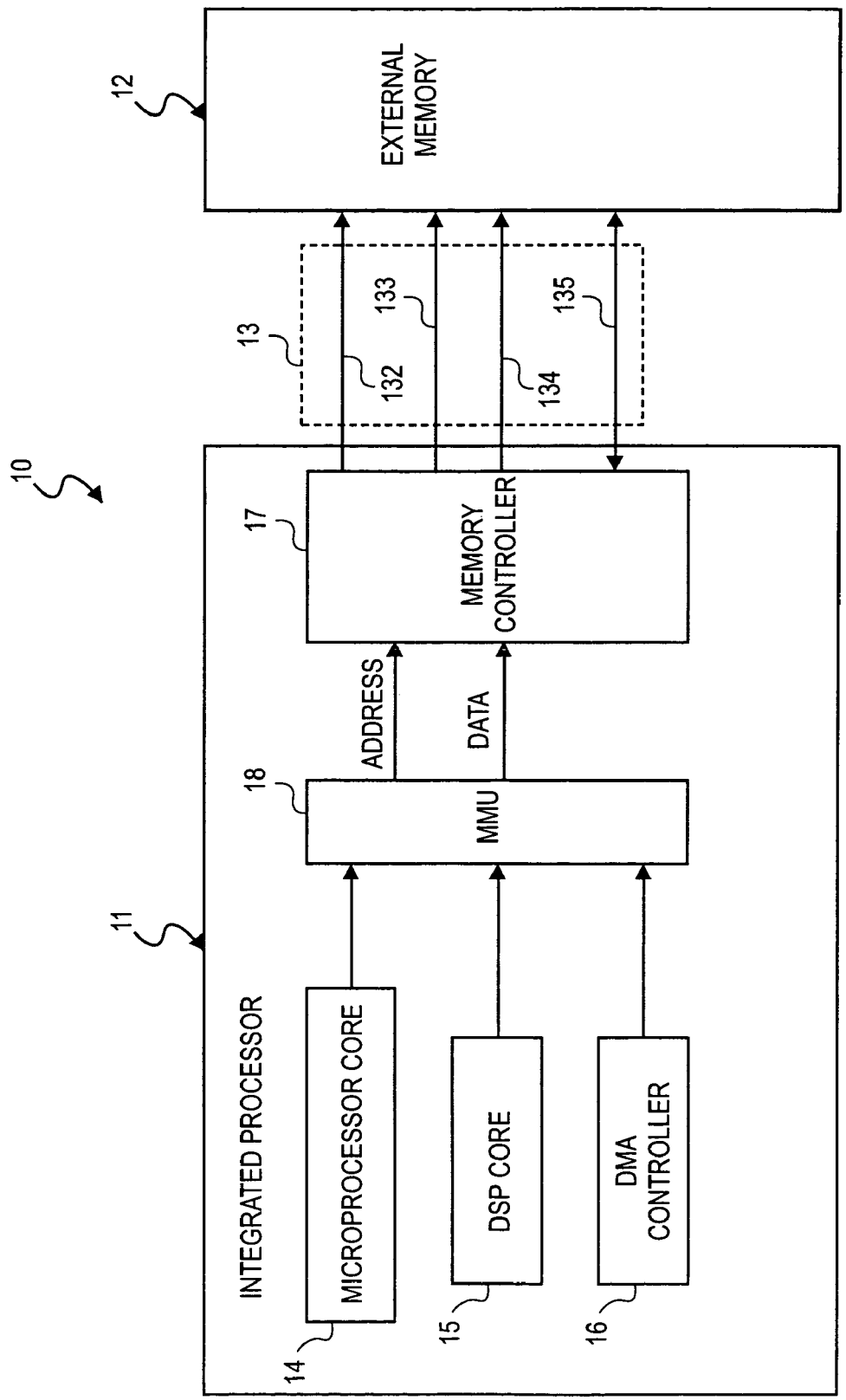
FIG. 1 is a block diagram of a memory controller inside of integrated circuits in communication with an external memory via an interconnect.

FIG. 1 shows an embodiment of a system 10 including integrated circuits 11 in communication with an external memory 12 via an interconnect 13, e.g., a low power double data rate (DDR) bus or a point-to-point connection. The term "integrated circuits" refers to circuit elements fabricated on a single chip. In one embodiment, integrated circuits may include one or more processing and control modules, e.g., a microprocessor core 14, a digital signal processor (DSP) core 15, and a direct memory access (DMA) controller 16, all of which communicate with external memory 12 through a memory controller 17. In one embodiment, integrated circuits 11 may also include a memory management unit (MMU) 18 for processing the address portion of the communication path between processing and control units (14, 15, 16) and memory controller 17. MMU 18 may translate a virtual address to a logical address. Virtual address increases the addressable memory space as viewed from integrated circuits 11 by using paging techniques well known in the art of computer programming. In alternative embodiment, memory controller 17 may be on a die separate from the processing and control modules.

External memory 12 may be a randomly addressable memory, e.g., SDRAM, read-only memory (ROM), flash memory, or similar volatile or non-volatile memory devices. External memory 12 may have diverse ranges of data widths, row sizes, or memory densities.

Interconnect 13 may include bank address lines 132, address lines 133, and command/control lines 134 for carrying memory bank address, row/column address, and command/control signals, respectively, from memory controller 17 to external memory 12. Interconnect 13 may also include data lines 135 carrying data and data strobes from external memory 12 to memory controller 17, or from memory controller 17 to external memory 12.

Figure 2:
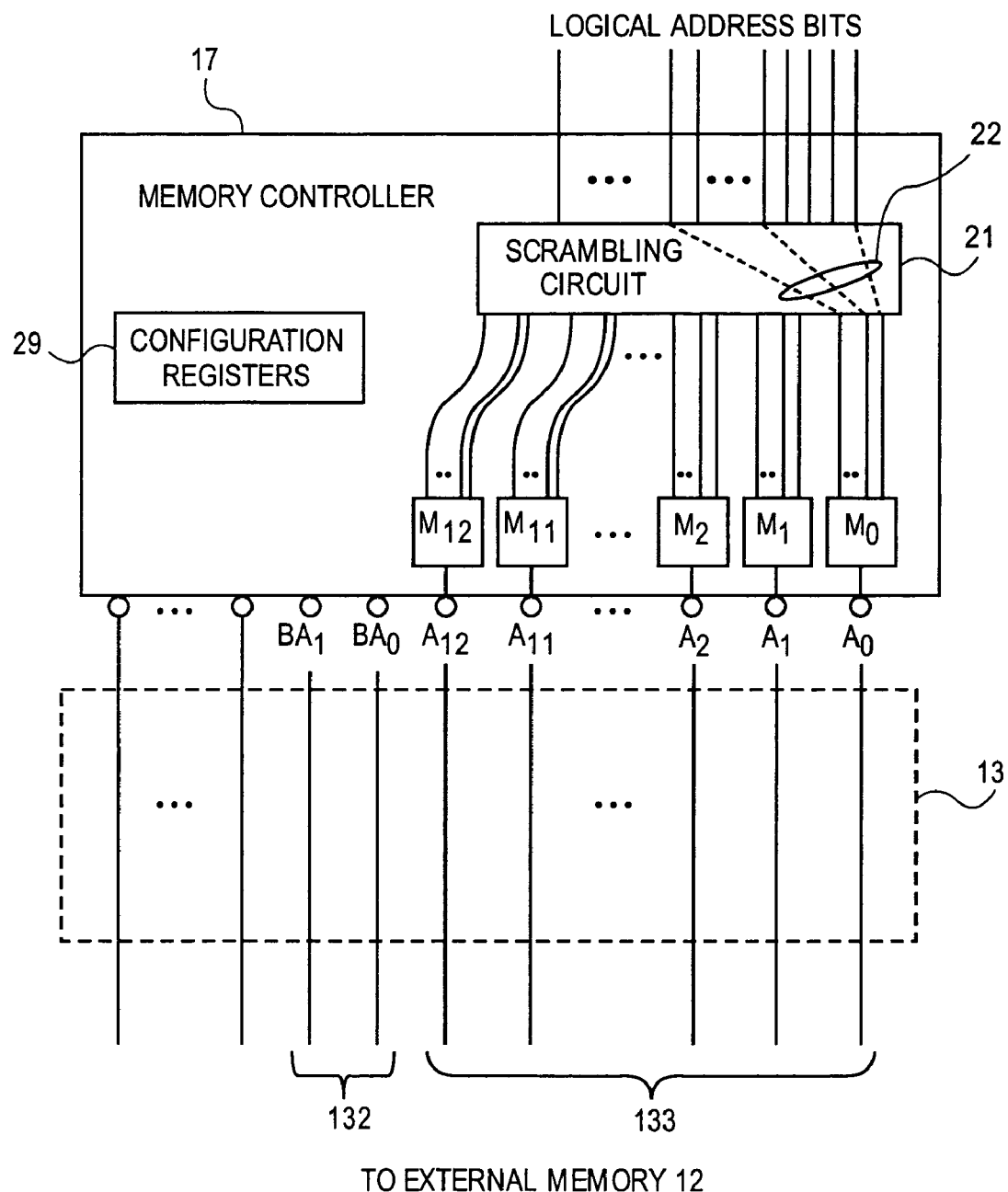
FIG. 2 is a block diagram of the memory controller of FIG. 1.

Referring to FIG. 2, memory controller 17 receives a logical address from processing and control units (14, 15, 16) or the MMU 18. Memory controller 17 may include a scrambling circuit 21 to scramble, or map, logical address bits onto the input a plurality of multiplexers (M0-M12). In one embodiment, scrambling circuit 21 may include a plurality of electrically conductive wires (only a few are shown in FIG. 2, e.g., wires 22) that connect each of the incoming logical address bits to one of the inputs of multiplexers (M0-M12). The output of each multiplexer (M0-M12) is connected to one of the physical address pins (A0-A12). The physical address pins (A0-A12) are connected to address lines 133 of interconnect 13 for delivering a physical address of a data unit to external memory 12, in preparation for a subsequent read or write operation on the address. Inside memory controller 17, each physical address pin (A0-A12) is connected to an output of a multiplexer (M0-M12). As there are more logical address bits than the physical address pins, the logical address bits are mapped to the physical address pins in multiple time phases. Multiplexers (M0-M12) perform the function of time-multiplexing the logical address bits. Each of the multiplexers (M0-M12) is connected to a selector (not shown) to select one of the input logical address bits in each time phase. In one embodiment, memory controller 17 may also include bank address pins (BA0, BA1) connecting to bank address lines 132 to deliver a bank address to external memory 12 for addressing a memory bank.

Memory controller 17 may also include configuration registers 29 to receive memory configuration information. Memory configuration information may include data width, row size, and memory density of external memory 12. Memory controller 17 uses the stored memory configuration information to determine the mapping between the logical address bits and the physical address pins.

Figure 3:
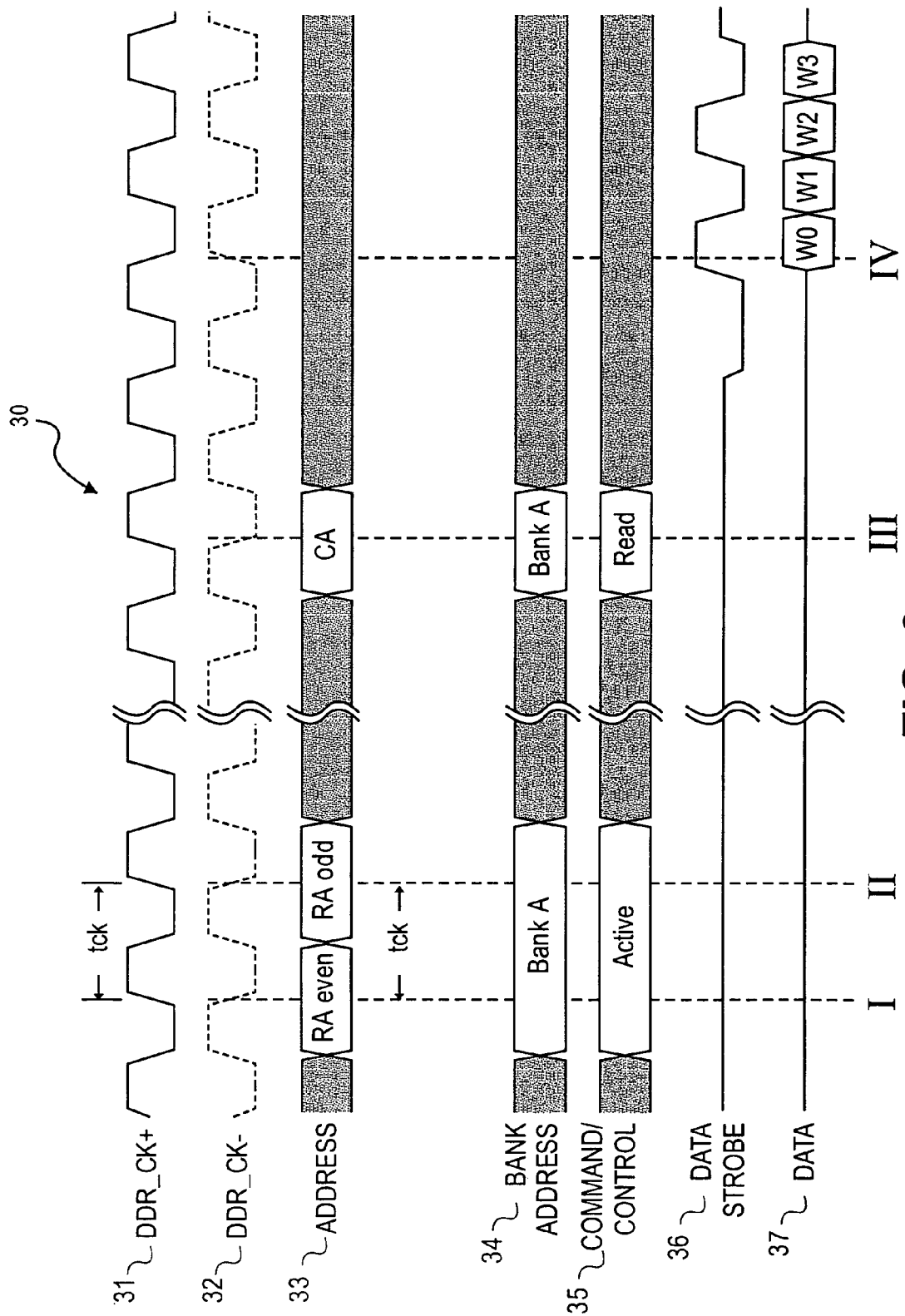
FIG. 3 is a timing diagram of a signaling protocol of the interconnect of FIG. 1.

FIG. 3 shows an example of a timing diagram 30 of the time-multiplexed output of memory controller 17 transmitted by interconnect 13. The vertical dotted lines I, II, III, IV on timing diagram 30 indicate four different instances of time, or four time phases. On the top of timing diagram 30 is a pair of differential clock signals (DDR_CK+31 and DDR_CK−32) defining a clock cycle (tck). The differential clock signals are generated by memory controller 17 and transmitted to external memory 12 on command/control lines 134. Those skilled in the art will appreciate that design variations, such as the number of clock cycles between the time phases, the alignment between the clocks and the other signals, or the order in which the signals are delivered, may be adopted without departing from the spirit of timing diagram 30.

Referring to FIG. 3 and FIG. 1, at time phase I, an address signal 33 carrying a portion of the row address, e.g., the even bits (indicated by RA even), is transmitted to external memory 12 on address lines 133. Concurrently, a bank address signal 34 carrying a bank address (indicated by Bank A) is transmitted on bank address lines 132, and a command/control signal 35 carrying an active command is issued on command/control lines 134. At time phase II, the remaining portion of the row address, e.g., the odd bits (indicated by RA odd), is transmitted on address lines 133, while bank address (indicated by Bank A) is transmitted on bank address lines 132 and an active command is issued on command/control lines 134. The active commands enable access to external memory 12 by commanding the memory to sense the memory cells addressed by the row address. The sensing operation prepares the memory cells of the addressed row for a read/write operation occurring at time phase III. At time phase III, address signal 33 carrying the column address (indicated by CA) is transmitted on address lines 133, concurrently with the bank address signal 34 transmitting the bank address and command/control signal 35 transmitting a read command. At time phase IV, a data signal 37 carrying the addressed data unit (indicated by W0) and some subsequent data units (indicated by W1-W3) is sent on data lines 135 to memory controller 17. The data units may be accompanied by data strobes 36, transmitted on data lines 135, to provide an accurate timing for memory controller 17 to capture the transmitted data.

FIG. 4 shows an example of an address scrambling scheme of memory controller 17 of FIG. 1 and FIG. 2. The address scrambling scheme is shown in the form of a mapping table 40 having table columns and table rows. The upper-case table column headers (A0-A12) represent the physical address pins of memory controller 17. BA0 and BA1 represent the bank address pins for outputting bank addresses. The lower-case entries (a1-a24) represent logical address bits of external memory 12 of FIG. 1. The row headers (I, II, III) represent the output of logical address bits at time phases I, II, and III of FIG. 3. Mapping table 40 is merely a convenient representation of a mapping between logical address bits and physical address pins. Memory controller 17 implements the mapping as physical wires connecting to the input of the multiplexers (M0-M12) of FIG. 2. For example, the input of the multiplexer at A0 is wired to the logical address bits a6, a7, and a1, each of which is transmitted at a different time phase.

In the example as shown, the total memory size is 256 Mbits with a row size of 128 bits and a data width of 16 bits. In the discussion herein, the mapping represented by mapping table 40 is adopted as a baseline design. Typically, a baseline design incorporates the smallest data width and row size contemplated by a circuit designer.

FIG. 4 shows 13 physical address pins (A0-A12) and 24 logical address bits (a1-a24). Of the 24 logical address bits, a1-a3 represent column address bits, a4 and a5 represent bank address bits, and a6-a24 represent row address bits. Even bits of row address a6, a8, a10, a12, a14, a16, a18, a20, a22, and a24 are outputted at time phase I from physical address pins A0-A9, respectively. Odd bits of row address a7, a9, a11, a13, a15, a17, a19, a21, and a23 are outputted at time phase II from physical address pins A0-A8, respectively. Bank address bits a4 and a5 are outputted from bank address pins BA0 and BA1, respectively, in all of the three time phases. The unoccupied physical address pins, e.g., A10-A12 at time phase I, have a "do-not-care" value. That is, the output, if any, from that particular pin at that particular time phase is ignored at the receiver side.

In one embodiment, a "do-not-care" value at an output pin may represent a "parking" state; that is, the multiplexer of that output pin drives the output to a prior state. For example, if the previous output of the pin is a logic high (e.g., "1"), a do-not-care at that pin represents a "1". In an alternative embodiment, a "do-not-care" value may represent a "floating" state; that is, the multiplexer does not drive the output pin, thus leaving the output in high impedance. A floated pin may have a valid or invalid signal state. A "do-not-care" value may alternatively represent either a "1" or a logic low "0" state regardless of its prior state. A skilled person in the art will appreciate that any convenient implementation of a do-not-care may be used to simplify the design and operation of the system. In the discussion that follows, a pin is said to have a "do-not-care" value if the pin is in any of the above-described states or other similar states.

The baseline design may be varied from the above description in a number of ways. In one embodiment, a baseline design may assign the most significant bits of the logical address (a23, a24) to the bank address. In another embodiment where the smallest data unit size is 8 bits, the baseline logical address bits may start from a0, causing the remainder of the column address bits (a1-a3) to left-shift one address pin in table 40. The rest of the address bits remain in the same position of table 40 if all of the other dimension parameters are unchanged.

Another variation of the baseline design may be produced by swapping of certain address bits. The logical address bits within each address group (e.g., bank address, row address, or column address of a SDRAM) may be arbitrarily swapped to produce a different baseline. For example, column address bit a1 may be swapped with either a2 or a3; row address bit a6 may be swapped with any of a7-a24. However, one advantage of keeping the even-odd pattern for the row address bits as shown is easy extensibility. When memory density increases, new row address bits may be added to the logical address in the most significant bit locations. These new row address bits may be placed in mapping table 40 according to the established even-odd bit pattern. None of the previously-mapped address bits, a1-a24, needs to be remapped. As the mapping pattern is highly predictable, the complexity of memory controller does not increase with the increased memory density.

The description that follows adopts mapping table 40 of FIG. 4 as the baseline design. FIG. 5 shows an example of the address scrambling scheme applied to a memory with an increased row size of 1024 bits. The total memory size stays the same as shown in table 40 of FIG. 4, which is 256 Mbits. The mapping of the logical address bits to physical address pins are described in a mapping table 50 having similar organization to table 40 of FIG. 4. The increase in row size requires three additional column bits; thus, mapping table 50 includes 6 column address bits. As the total memory size is constant, the three additional column address bits necessitates three fewer row address bits, as compared to the baseline of FIG. 4. The three least significant row address bits (a6-a8) are replaced with do-not-care values (represented by "x"s) to produce the new mapping of FIG. 5. As a result, physical address pins (A0 and A1) which were mapped in time phase I in the baseline, become unmapped in time phase I under the new mapping. Likewise, physical address pin (A0) which was mapped in time phase II in the baseline, becomes unmapped in time phase II under the new mapping.

Unlike conventional scheme where row address bits are right-justified when row sizes increase, the address scrambling scheme allows the physical address pins (A0 and A1) to be unmapped. The placement of the do-not-care values allows the row and column address bits to keep a constant alignment to the physical address pins regardless of changes in row sizes. Thus, memory controller 17 needs minimal reconfiguration when the row size of the memory changes.

Likewise, minimal reconfiguration of memory controller 17 is needed when the data width of the memory increases from the baseline. For example, if the data width is increased to 32 bits, column address bit a1 in table 40 or table 50 may be replaced by a do-not-care value while all of the other logical address bits remain in the same position.

Some memory technologies adopting address groups of bank address, row address, or column address, e.g., a SDRAM, may allow variations to the above address scrambling scheme as follows. After applying the address scrambling scheme to a baseline design, the logical bits within each address group may be further swapped. For example, in FIG. 5, assume that the "x" under A1 is swapped with a10. As the baseline of FIG. 4 has already required that the input of multiplexer M1 be connected to signal lines carrying a2, a8, and a9, the multiplexer M1 now needs to be additionally connected to a10 to implement the swapping. The additional connection may incur additional wires in the scrambling circuit 21. Thus, the three "do-not-care" values of mapping table 50 are not necessarily mapped to the positions as shown. One or more of the "do-not-care" value may be swapped with another row address bit within the same address group.

In certain scenarios where address grouping is more restrictive than that of a SDRAM, e.g., a flash memory, the swapping of the address bits may be more restrictive as well. In one embodiment, the row address bits a6-a24 of a flash memory may be divided into address groups including a partition address (e.g., a22-a24), a block address (e.g., a15-a21), and an sub-block address (e.g., a6-a14). These address bits may not be swapped across the address groups. However, within each address group the address bits may be arbitrarily swapped.

The embodiments as described above may ease the adoption of any memory with a different size or organization (e.g., a flash memory) onto a low power DDR bus, which currently supports the SDRAM memory technology only. Modification of memory controller 17 is simplified, thus greatly increasing its configuration flexibility.

In the foregoing specification, specific embodiments have been described. It will, however, be evident that various modifications and changes can be made thereto without departing from the broader spirit and scope of the appended claims. The specification and drawings are, accordingly, to be regarded in an illustrative rather than a restrictive sense.

What is claimed is:

1. A method comprising:
reconfiguring a memory controller for a memory device from a baseline design of the memory controller, the baseline design associated with a baseline memory device that has a smallest data width and a smallest row size among a group of memory devices including the memory device; and
mapping logical address bits of the memory device to time-multiplexed output of physical address pins of the memory controller, wherein an amount of the reconfiguring is reduced by unmapping a number of the physical address pins in a time phase while maintaining a mapping of the rest of the physical address pins in the time phase, the number corresponding to a change in the memory device from the baseline design with respect to the data width or the row size.

2. The method of claim 1, wherein mapping logical address bits further comprises:
placing a do-not-care value onto the output of each of the unmapped physical address pins in the time phase.

3. An apparatus of a memory controller comprising:
a plurality of physical address pins; and
a plurality of multiplexers to map logical address bits of a memory device to time-multiplexed output of the physical address pins, wherein
the memory controller is to be reconfigured for the memory device from a baseline design of the memory controller, the baseline design associated with a baseline memory device that has a smallest data width and a smallest row size among a group of memory devices including the memory device, an amount of the reconfiguring reduced by unmapping a number of the physical address pins in a time phase while maintaining a mapping of the rest of the physical address pins in the time phase, the number corresponding to a change in the memory device from the baseline design with respect to the data width or the row size.

4. The apparatus of claim 3 wherein an output of each multiplexer is coupled to each physical address pin to select one of the logical address bits in each time phase.

5. The apparatus of claim 4 wherein the memory controller further comprises:
configuration registers to store dimensional parameters of the memory device to which the memory controller is coupled, wherein the selection of the logical address bits is based on the dimensional parameters.

6. The apparatus of claim 4 wherein the memory controller further comprises:
scrambling circuitry to map the logical address bits to an input of the multiplexers.

7. The apparatus of claim 6 wherein the scrambling circuitry includes electrically conductive wires to transmit each of the logical address bits to at least one of the multiplexers.

8. A system comprising:
a memory device that is randomly addressable; and
a memory controller coupled to the memory device, the memory controller including:
a plurality of physical address pins coupled to the memory device; and
a plurality of multiplexers to map the logical address bits of the memory device to time-multiplexed output of the physical address pins, wherein
the memory controller is to be reconfigured for the memory device from a baseline design of the memory controller, the baseline design associated with a baseline memory device that has a smallest data width and a smallest row size among a group of memory devices including the memory device, an amount of the reconfiguring reduced by unmapping a number of the physical address pins in a time phase while maintaining a mapping of the rest of the physical address pins in the time phase, the number corresponding to a change in the memory device from the baseline design with respect to the data width or the row size.

9. The system of claim 8 wherein an output of each multiplexer is coupled to each physical address pin to select one of the logical address bits in each time phase.

10. The system of claim 9 wherein the memory controller further comprises:
configuration registers to store dimensional parameters of the memory device to which the memory controller is coupled, wherein the selection of the logical address bits is based on the dimensional parameters.

11. The system of claim 9 wherein the memory controller further comprises:
scrambling circuitry to map the logical address bits to an input of the multiplexers.

12. The system of claim 11 wherein the scrambling circuitry includes electrically conductive wires to transmit each of the logical address bits to at least one of the multiplexers.

13. A method comprising:
receiving a logical address of a data unit of a memory, wherein the logical address comprises a row address having even row address bits and odd row address bits; and
mapping the logical address to time-multiplexed output of physical address pins, wherein all of the even row address bits are mapped in one of time phases for outputting the row address and all of the odd row address bits are mapped in another of the time phases for outputting the row address.

14. The method of claim 13 further comprises:
placing new most-significant row address bits of the logical address onto the least significant physical address pins that are unmapped in the time phases for outputting the row address in a baseline design according to the mapping of the odd and even row address bits if density of the memory increases from the baseline design.

15. The method of claim 13 further comprises:
replacing at least one most significant row address bit of the logical address with a do-not-care value if density of the memory decreases from the baseline design.

16. A system comprising:
a memory; and
integrated circuits coupled to the memory, the integrated circuits including:
a module to generate a logical address of a data unit of the memory, wherein the logical address comprises a row address having even row address bits and odd row address bits; and
a memory controller to map the logical address to time-multiplexed output of physical address pins, wherein all of the even row address bits are mapped in one of time phases for outputting the row address and all of the odd row address bits are mapped in another of the time phases for outputting the row address.

17. The system of claim 16 wherein the memory controller further comprises:
a plurality of multiplexers, an output of each multiplexer coupled to each physical address pin to place new most-significant row address bits of the logical address onto the least significant physical address pins that are unmapped in the time phases for outputting the row address in a baseline design according to the mapping of the odd and even row address bits if density of the memory increases from the baseline design.

18. The system of claim 16 wherein the memory controller further comprises:
a plurality of multiplexers, an output of each multiplexer coupled to each physical address pin to replace at least one most significant row address bit of the logical address with a do-not-care value if density of the memory decreases from the baseline design.

* * * * *